(12) United States Patent  (10) Patent No.: US 6,830,006 B2
Baumer et al.                       (45) Date of Patent:        Dec. 14, 2004

(54) METHOD AND APPARATUS FOR PRODUCING PARTICLES OF A FOODSTUFF

(76) Inventors: Johannes Baumer, Rosenstr 18, B-4710, Lentzen (DE); Jürgen Becker, Heydenstr 29, 52134, Herzogenrath (DE); Dietmar Otte, Walheimer Str. 135, 52076, Aachen (DE); Dieter Stauber, Chr. Derichs-Str. 28, 51234, Herzogenrath (DE)

( * ) Notice: Subject to any disclaimer, the term of this patent is extended or adjusted under 35 U.S.C. 154(b) by 192 days.

(21) Appl. No.: 10/150,594

(22) Filed: May 17, 2002

(65) Prior Publication Data

US 2002/0172744 A1 Nov. 21, 2002

(30) Foreign Application Priority Data

May 19, 2001 (DE) .......................................... 101 24 471

(51) Int. Cl.[7] .................................................. B05C 5/02
(52) U.S. Cl. .............................. 118/13; 118/23; 118/24
(58) Field of Search .............................. 118/13, 23, 24; 426/515, 521

(56) References Cited

U.S. PATENT DOCUMENTS 4,548,158 A  * 10/1985  Sollich ........................ 118/24

FOREIGN PATENT DOCUMENTS

| DE | DO-OS 2 136 734 | 3/1973 |
|---|---|---|
| EP | 0 332 287 A1 | 9/1989 |
| EP | 0 617 248 A1 | 9/1994 |
| EP | 0 974 275 A1 | 1/2000 |
| EP | 0 974 275 B1 | 1/2000 |
| EP | 0 976 333 A2 | 2/2000 |
| EP | 0 976 333 A3 | 2/2000 |
| EP | 0 998 854 A1 | 5/2000 |
| EP | 1 121 867 A1 | 8/2001 |
| EP | 1 149 536 A1 | 10/2001 |
| FR | 2 638 066 | 4/1990 |
| FR | 2 602 832 | 2/1998 |
| GB | 351132 A | 6/1931 |
| GB | 736010 A | 8/1955 |
| GB | 956933 | 4/1964 |
| GB | 2 023 789 A | 1/1980 |
| JP | 01042211 | 2/1989 |

* cited by examiner

Primary Examiner—Laura Edwards
(74) Attorney, Agent, or Firm—Boyle Fredrickson Newholm Stein & Gratz, S.C.

(57) ABSTRACT

An apparatus (1) is used for producing particles of a foodstuff with a fat content of at least 50%, a sugar content of not more than 20% and a water content of not more than 10%. The foodstuff which is present in liquid form can be applied by means of a dosing device (2) in the form of a film or in the form of a strip onto the moved surface of a cooling device (5) with which the foodstuff is at least partly hardenable. In order to enable the production of particles under clean room conditions in an economically viable manner it is proposed that the dosing device (2) comprises a permanently opened pass-through cross section and an elastically deformable membrane (15) which is in contact with one surface with the liquid, sterilized or pasteurized foodstuff. The membrane (15) can be reversibly deflected in a direction approximately perpendicular to its plane, as a result of which the volume of a conveying chamber for the foodstuff can be changed. Moreover, the dosing device (2) and the cooling device (5) are disposed in an encapsulated way within an enclosed vessel (7) which can be sterilized or pasteurized in its interior (24).

20 Claims, 3 Drawing Sheets

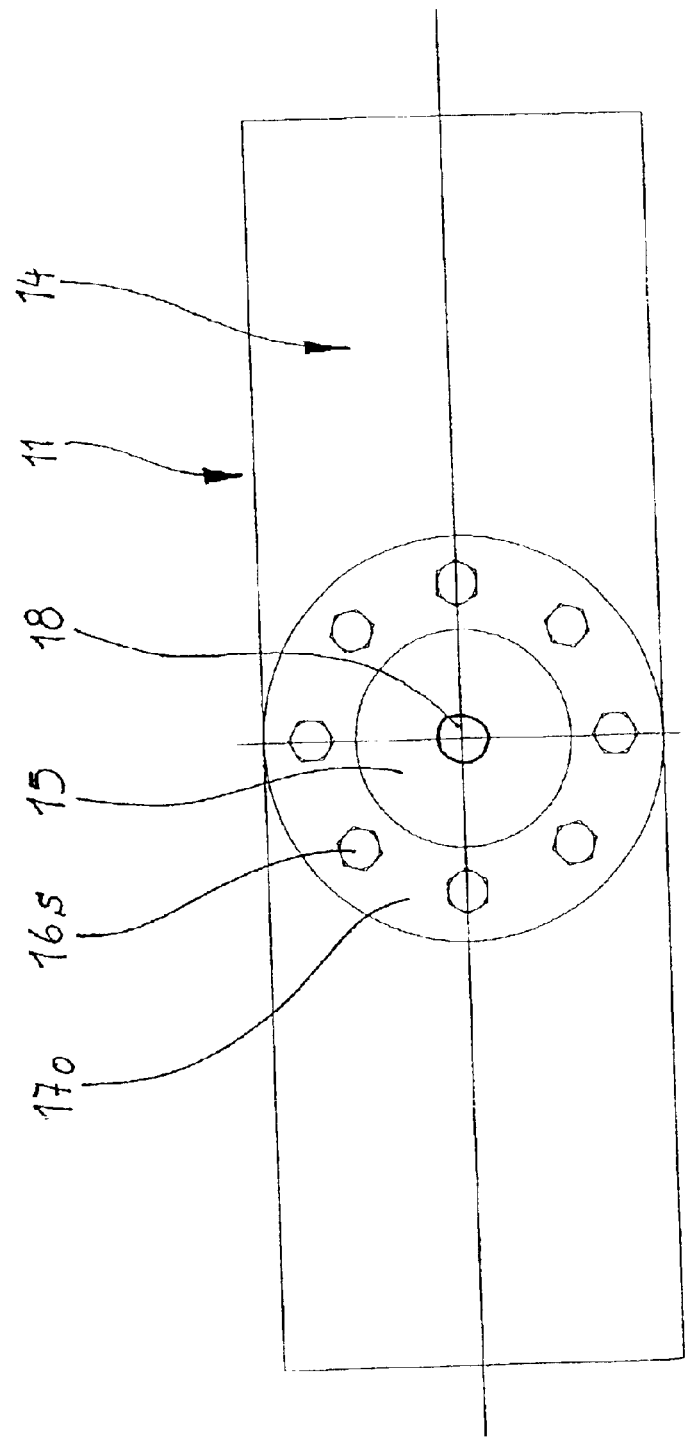

METHOD AND APPARATUS FOR PRODUCING PARTICLES OF A FOODSTUFF

BACKGROUND OF THE INVENTION

The invention in general relates to an apparatus for producing particles of a foodstuff. Specifically, it relates to foodstuffs having a fat content of at least 50%, a sugar content of not more than 20% and a water content of not more than 10%, with the foodstuff which is present in liquid form being applicable by means of a dosing device in the form of a film or in the form of a strip onto the moved surface of a cooling device with which the foodstuff is at least partly hardenable.

It is generally known in apparatuses for producing chocolate particles to apply the liquid chocolate at a temperature of approximately 30° C. to 35° C. onto a cooled surface at first in the form of a cooling roller. The application generally occurs in the form of a continuous film with the thickness remaining as even as possible, which thickness can be set with a calibrating roller. The outside jacket of the cooling roller and the outside jacket of the calibrating roller enclose a gap in the thickness of the chocolate film. The passage of a thicker film is prevented by the calibrating roller, which is why it is possible to produce a back-up of the liquid foodstuff, i.e. a bath with a larger depth than the thickness of the later film.

The surface temperature of the cooling roller is at the moment of contact with the liquid chocolate approximately 5° C. to 10° C. After the first contact of the cooling roller with the chocolate, a crystallization in form of a thin layer occurs at first in the zone of the contact surface. Furthermore, starting from the surface of the chocolate film which is averted from the cooling roller there is also a commencing crystallization after the passage of the calibrating roller as a result of the convective heat transmission to the ambient gaseous medium which occurs there, with the temperature of the gaseous medium being at approximately 10° C. to approximately 20° C. From the center of the still liquid chocolate film there is a thermal conduction in the direction towards both surfaces, i.e. in the direction towards the cooling roller jacket as well as in the direction towards the gaseous medium encompassing the cooling roller.

The chocolate film leaves the cooling roller in the known method in a state which is crystallized only from the edges, i.e. only in a partial manner, and is therefore placed on the surface of a cooling belt which is led through a cooling tunnel which has a length of approximately 10 to 30 meters. Cold air is guided through the cooling tunnel in a counter-flow, which air has a temperature of approximately 10° C. to 15° C. The reason for such a complex cooling process is caused by the reasons arising from the special properties that are demanded by high-quality chocolate. A specially desirable crystal structure can only be obtained by cooling with a very low temperature gradient, in which the hardened chocolate shows for the longest possible period the desired gloss and the desired resistance against fat bloom formation.

In the recent past the demand has increasingly arisen in the users of such chocolate particles to also use such particles in aqueous non-frozen media such as yogurts or sweet desserts. In order to avoid problems with microbiology even after a certain storage period of the end product containing the chocolate particles, it is necessary to strive towards the lowest possible number of germs in the chocolate. Since raw cocoa naturally has a relatively high germ infestation, which is harmless per se in the processing into chocolate outside of aqueous non-frozen media, the reduction of germs of the liquid chocolate by pasteurization or sterilization is necessary. The goal of chocolate particles with low germ infestation can only be achieved when a subsequent new infestation with germs can be prevented after the formation of the particles subsequently to a preparational pasteurization or sterilization of the chocolate. In the methods according to the state of the art and the pertinent apparatuses with their considerable constructional sizes, it is hardly possible to ensure low germ infestation or even freedom from germ infestation with economically viable measures. Thus it is not cost effective to perform the entire formation of particles, which also includes the hardening on a cooling roller and a downstream cooling belt, under clean room conditions as is conventionally applied in the pharmaceutical business.

The disadvantage in known particle formation in the forming of a continuous film and its subsequent comminution in the hardened state for achieving the desired particle size is that an exact geometrical shape of the particles cannot be ensured. Particles of a certain size distribution but not precisely one specific size can be achieved for example with the help of a crusher device depending on the chosen crusher tools. Moreover, the efforts relating to design and equipment for successively performed steps in forming a continuous film and in comminuting the hardened film are relatively high.

An alternative method for producing particles of a foodstuff is known from EP 0 976 333 A2 hereby incorporated by reference. Here there is a dripping of liquid foodstuff in a stock of nozzles, whereupon the drops cover a drop path within a drop tower of a height of approximately 10 to 15 m. A cooling gas is guided in a counter-flow to the falling foodstuff particles through the drop tower, with which the hot drops are in a convective heat exchange. At the end of the drop path the foodstuff particles are hardened at least to such an extent that they are no longer plastically deformable when hitting the surface after the occurring acceleration. Depending on the setting of the process parameters (temperature at the stock of nozzles, aperture cross section of nozzles, temperature and speed of cooling gas), it is possible to produce both very evenly formed spherical particles as well as thread-like and ribbon-like particles of irregular length as well as intermediate shapes of the aforementioned types. If the foodstuff is supplied in a sterilized or pasteurized form during the dripping, it is possible to produce sterile or pasteurized particles if the drop tower was also sterilized or pasteurized prior to commencement of the production. The disadvantageous aspect of the known method is on the one hand the relatively low production capacity and on the other hand the high constructional complexity, especially the mandatory large extension in the vertical direction in order to achieve the required cooling periods. Moreover, it is not possible to achieve all the desired particle shapes in the prior art method.

SUMMARY AND OBJECTS OF THE INVENTION

The present invention is based on the object of improving an apparatus of the kind as described above in such a way that the production of foodstuff particles is possible in a cost-effective manner, whereby the change between different particle sizes is to be enabled without any major efforts. Furthermore, the proposed apparatus should allow the production of pasteurized or sterilized particles, which is why the chosen dosing devices must meet the conditions necessary for a reliable and simple pasteurization or sterilization.

Based on an apparatus of the kind mentioned above, this object is achieved in accordance with the invention in such a way that the dosing device comprises an elastically deformable membrane which is in contact with one surface having present the liquid, sterilized or pasteurized foodstuff and which can be deflected in a direction approximately perpendicular to its plane, as a result of which the volume of a conveying chamber for the foodstuff can be changed. Further, the dosing device and the cooling device are disposed in an encapsulated way within an enclosed vessel preferably having a sterilized or pasteurized interior.

Due to the change in volume of the conveying chamber for the foodstuff with the help of the deflection of an elastically deformable membrane, a simple possibility is created to a) precisely dose the quantity of foodstuff passing through the pass-through cross section of the dosing device and b) simultaneously ensure the requirements placed on easy sterilizability and pasteurizability of the apparatus prior to the commencement of production. Because the membrane tightly seals the conveying chamber during its sterilization or pasteurization, sterilization of the conveying chamber of the dosing device can occur with superheated steam or hot air. By using an elastically deformable membrane it is especially possible to omit valve devices with mechanically sealing parts. Especially in the case of a rapid cooling of the liquid foodstuff immediately after leaving the dosing device it is thus possible to prevent the likelihood that highly undesirable deposits occur on the seat surfaces of the valves by undesirable crystallization occurring at an early stage.

A further advantage of the apparatus in accordance with the invention is that it is possible to omit the pass-through of axially movable tappets by limiting the conveying chamber, i.e. the space which comes into contact with the liquid and sterilized or pasteurized foodstuff. Such pass-throughs are particularly critical with respect to the process of sterilization or pasteurization of the apparatus, because there is no defined limit between the sterilized or pasteurized zone and the ambient environment of the apparatus. Each axial stroke movement of such a tappet would move the sterile border from the outside to the inside towards the sterile chamber, thus leading to an uncontrolled conveying process of germs from the ambient environment into the sterile chamber. A membrane, however, leads to a hermetic sealing of the sterilizable or pasteurizable zone. Even in the case of an oscillating conveying movement of the membrane, there will not be any removal of said hermetic sealing of the conveying chamber.

In accordance with an embodiment of the apparatus of the invention, it is provided that the membrane forms a section of the border of the sterilization or pasteurization zone. In this case there are many options for the actuation of the membrane from the surface averted from the sterilization or pasteurization zone. As a result, the membrane can be coupled for example with a tappet which is connected in a non-positive or positive manner or directly with the fabric. There are also many options available for its drive without having to take into account any considerations as to sterilizability or pasteurizability, because said drive is located already completely outside of the border of the sterilization or pasteurization zone.

As an alternative to the aforementioned embodiment it is also possible that the membrane is connected with an actuating tappet on the side which is averted from the foodstuff, which tappet can be guided through the border of the sterilizable or pasteurizable zone by means of a compensator which is hermetically sealed and can be changed elastically in its length. In this case, it is not the membrane per se which forms the border to the sterilizable or pasteurizable zone, so that in the case of damage to it or an incomplete sealing it is not necessary to fear any penetration of germs into the conveying chamber and thus into the liquid foodstuff. This is because the zone which is adjacent to the opposite surface of the membrane is also sterilized or pasteurized.

Preferably, the dosing device comprises at least one nozzle for the outlet of the liquid foodstuff from the conveying chamber. Especially in the production of chocolate particles it is advantageous to provide a strip of capillary nozzles whose outlet diameter is approximately 0.5 mm to 3 mm.

In a further development of the invention it is proposed that the outlet opening of the capillary nozzles is provided with a distance from the moved surface of the cooling device of between 0.5 mm to 10 mm. The cooling device can concern a rotating cooling roller or a moved revolving cooling belt or a succession of the two aforementioned devices. For reasons of minimizing the size of the apparatus, it is preferable to allow the complete hardening of the liquid foodstuff to occur either alone on the cooling roller or alone on the cooling belt. The encapsulation of the entire apparatus as required for production under sterile conditions requires less efforts in this case.

The efforts to ensure the conditions for the continuous production of the sterilized or pasteurized particles can be reduced even further when the temperature of a gas disposed in the interior of the vessel is in the zone of the charging of the liquid foodstuff lower than 0° C., preferably lower than −20° C., and the temperature of the surface of the cooling device is in the zone of the charging of the liquid foodstuff lower than 0° C., preferably lower than −20° C. The size and thus also the costs for the encapsulation can thus be reduced considerably by the reduction of the hardening time. Although particles which are hardened under the application of such high temperature gradients do not show the crystal properties which are typical for conventional chocolate, they are still especially suitable for use in an aqueous non-frozen medium, because the criterion of gloss of the particle in the dry state is especially irrelevant. From a taste and sensory point of view such rapidly hardened chocolate particles are perfect.

It is finally proposed in accordance with the invention that a continuously operatable rotary pump is provided for the conveyance of the foodstuff through the conveying chamber and the pass-through cross section of the dosing device. In contrast to reciprocating piston pumps for example, one can omit the use of return valves in rotary pumps in the line section between the pump and the conveying chamber. In the case of a deflection of the membrane into the conveying chamber and thus a reduction of its volume, the thus resulting increase in pressure into the conveying chamber does not allow any return flow of the liquid foodstuff towards the rotary pump, i.e. against the conveying direction, because the rotary pump blocks the cross section of the conveying line completely at all times by means of its conveying member. The increase in pressure into the conveying chamber of the dosing device as a result of the membrane deflection thus always leads to the intended conveyance of the liquid foodstuff through the pass-through cross section of the dosing device, i.e. towards the receiving surface of the cooling device. In this way it is possible to control the interruption or renewed supply of the liquid foodstuff emerging from the dosing device in a very efficient manner.

BRIEF DESCRIPTION OF THE DRAWINGS

The invention is now explained in closer detail by reference to an embodiment of an apparatus for producing chocolate particles as shown in the drawings, wherein:

FIG. 3 shows a top view of the dosing device.

DETAILED DESCRIPTION OF THE INVENTION

Figure 1:
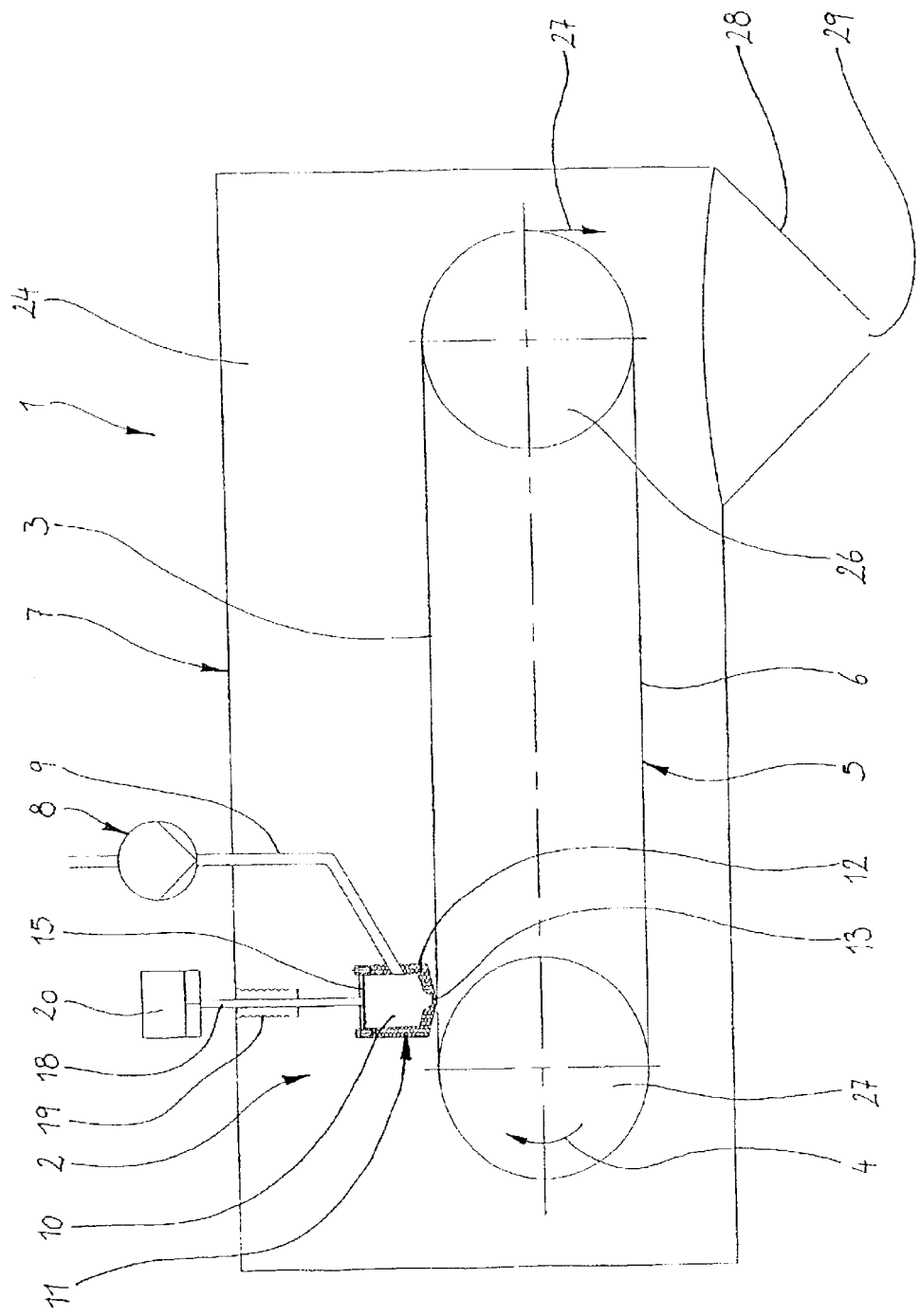
FIG. 1 shows a schematic side view of an apparatus for producing chocolate particles with a dosing device for the dosed supply of the sterilized liquid chocolate.

An apparatus 1 for producing sterile chocolate particles as shown in FIG. 1 comprises a dosing device 2 with which the liquid chocolate can be deposited on a surface of a cooling device 5 in form of a cooling belt 6 which revolves in the direction of arrow 4. The apparatus 1 comprises an outside stainless steel vessel 7 which completely encapsulates the cooling device 5 and the dosing device 2. The vessel 7 concerns a cylindrical stainless steel boiler which is pressure-tight up to approximately 3 bars (or 43.5 PSI) of absolute pressure.

The chocolate to be apportioned and to be shaped into particles is sterilized in a sterilization apparatus (not shown in closer detail) under application of temperature and pressure as well as the addition of steam. The sterilized chocolate is conveyed from an intermediate storage reservoir (also not shown) with the help of a conveying device 8 in the form of a positive-displacement pump through a conveying line 9 to a conveying; chamber or reservoir 10 of the dosing device 2. During the operation of the apparatus 1 the reservoir is substantially completely filled with liquid chocolate.

Figure 2:
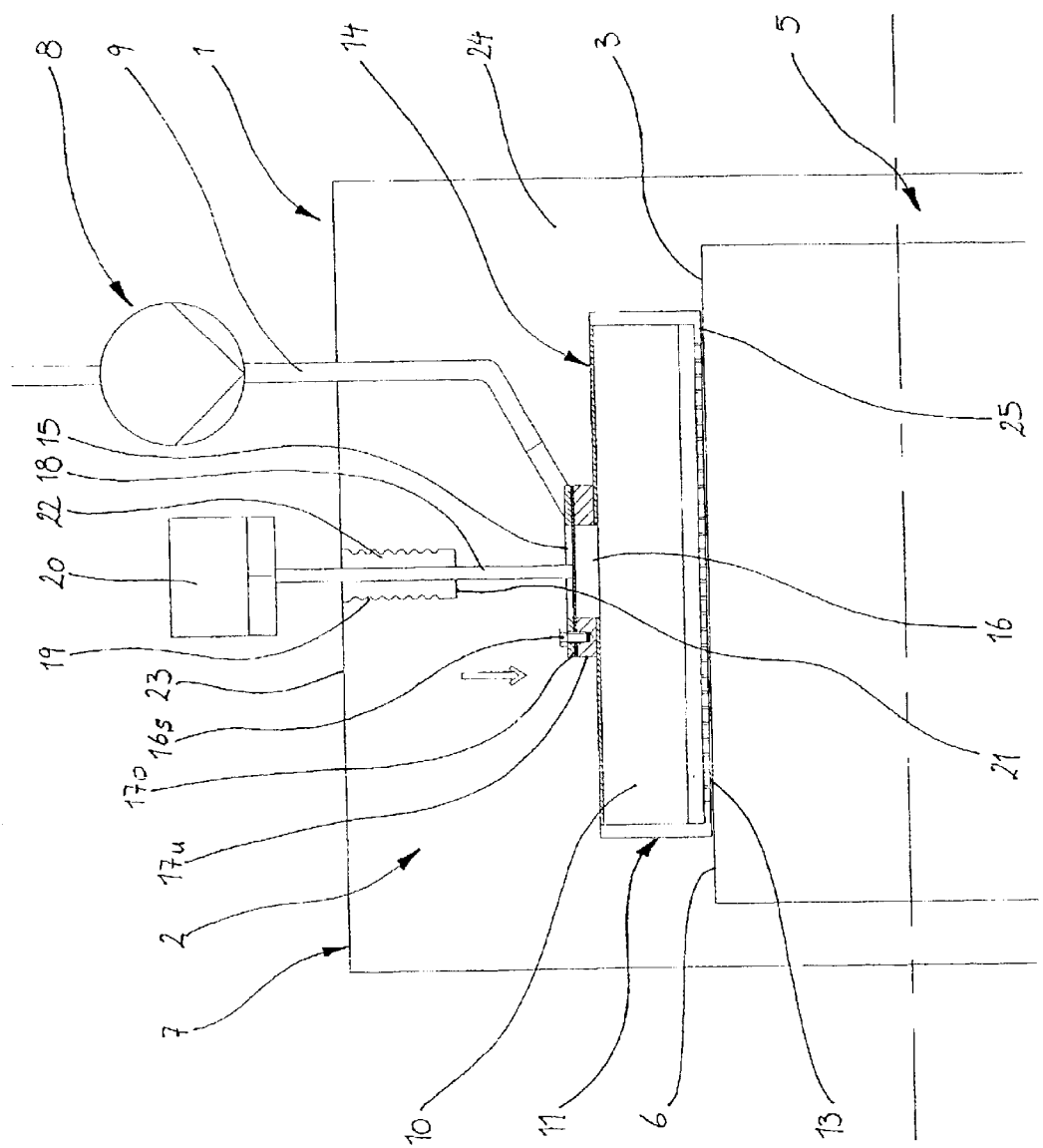
FIG. 2 shows a front view of the dosing device with a membrane.

As is shown especially in FIG. 2, the reservoir 10 is disposed within a longitudinal grooved vessel 11 whose jacket is insulated and is provided in the interior with a non-visible heating device in order to keep the chocolate in the molten state and at the desired temperature and viscosity level. The vessel 11 comprises in its floor 12 a plurality of capillary nozzles 13 which are disposed in the longitudinal direction in an equidistant manner adjacent to one another and which are provided with a width extending over a majority of the width of the cooling belt 6.

The vessel 11 is closed off on its upper side with a lid 14 in the central zone of which (cf. FIG. 3) there is disposed an opening 16 which is closed off in a gastight manner with a membrane 15. The membrane 15 is tensioned in a sealed manner by means of screws 16s between an upper flange 17o and a lower flange 17u.

A tappet 18 is fastened to the surface of the membrane 15 which is averted from the reservoir 10, which tappet is led out of the outer vessel 7 of the apparatus 1 through a bellows-like compensator 19 made of stainless steel. The tappet 18 is connected in a non-positive way with an electric or pneumatic drive device 20, by means of which the tappet 18 can be moved up and down in an oscillating way. Said upward and downward movement of the tappet 18 is transmitted to the membrane 15 which is deflected strongest in its central zone close to tappet 18 and increasingly less towards the upper flange 17o.

The compensator 19 comprises a bellows-like outside jacket and is welded in the zone of its lower face side 21 with the outside jacket of the tappet 18. In the zone of an upper annular face side 22, the compensator 19 is welded together with an upper wall 23 of the vessel 7. This ensures a hermetic pressure-tight sealing of the interior 24 of vessel 7, despite the fact that the tappet 18 is movable in the vertical direction.

During the operation of apparatus 1, liquid sterilized chocolate is conveyed continuously with the help of the conveying device 8 through the conveying line 9 to the reservoir 10 of vessel 11 of dosing device 2. The reservoir 10 is filled with liquid chocolate right below the lower side of the membrane 15 which faces said liquid chocolate which can be set to the desired viscosity with the help of the heating device of the vessel 11.

As a result of an oscillating upward and downward movement of the tappet 18 which is produced by the drive device 20 the membrane 18 also performs an oscillating bulging upward and downward movement, as a result of which the volume of reservoir 10 is changed in the vessel 11. Since a return flow of the liquid chocolate in the conveying line 9 is not possible due to the conveying principle of the conveying device 8 (positive-displacement pump), a downward movement of the tappet 18 automatically leads to a conveyance of the liquid chocolate through the capillary nozzles 13 on the lower side of the dosing device 2. The lower side 25 of the vessel 11 is located at a distance of approximately 1.5 mm from the surface 3 of the cooling belt 6.

As a result of the conveying movement of the cooling belt 6, the chocolate strands emerging substantially evenly from all capillary nozzles 13 of the nozzle lip are taken up by the cooling belt 5 and conveyed in the direction of the remotely disposed deflection roller 26.

In the interior 24 of the vessel 7 there are not only sterile conditions but also a particularly low temperature in the range of approximately −30° C. to −80° C. Furthermore, the temperature of the cooling belt 6 after leaving the deflection roller 27 is approximately −30° C. up to −80° C. The liquid chocolate which leaves the capillary nozzles 13 at a temperature of approximately 35° C. to 40° C. is cooled in an extremely rapid manner on the surface 3 of cooling belt 6, whereby the specific crystal structure as desired in the production of classical chocolate particles is not obtained. In the particles of the chocolate which are produced according to the present method there is a clear loss of gloss already after a short storage period. The maintenance of gloss of the finished particles is completely irrelevant with respect to the purpose as intended for such sterilized chocolate particles in dairy products or fruit preparations, i.e. for use in liquid aqueous media.

Due to the large temperature difference between the liquid chocolate leaving the nozzle lip and the gas temperature in the interior 24 of the vessel 7 and the low surface temperature of the cooling belt 6, the hardening process of the chocolate particles progresses so rapidly that at the end of the cooling belt 5 at the location of the arrow 27 chocolate particles which are already substantially hardened from the outside to the inside will fall off the surface 3 of the cooling belt 6 and will reach a funnel 28 in order to leave the interior 24 of the vessel 7 through an opening 29.

In the interior 24 of vessel 7 there is nitrogen gas which is guided through the vessel 7 in a counter-flow to the direction of movement of the cooling belt 6.

In the embodiment of the apparatus 1 as illustrated in FIGS. 1 to 3, the lower face side 21 of the compensator 19 forms the border between the sterile chamber in the interior 24 of vessel 7 and the non-sterile ambient environment. As an alternative to such an embodiment it is also possible that the border of the sterile chamber is formed by the membrane 15 per se. In this case the membrane could be a part of the upper wall 23 of the vessel 7, with the flanges 17o and 17u forming the border between the movable (membrane 15) and the rigid (walls of vessel 7) border between the sterile zone and the non-sterile zone.

Particles with different diameters and different length are obtained depending on the setting of the lifting frequency of the drive device 20 in conjunction with the conveying rate of the conveying device 8, the temperature-dependent viscosity of the sterilized chocolate in the reservoir 10 and the geometry of the capillary nozzles 13. Whereas one borderline case of drop- or lentil-shaped chocolate particles is formed, the other borderline case consists of virtually endless chocolate ribbons which fall from the cooling belt only in the curved transitional region of the deflection roller 26 and thus reach the funnel 28. It is understood that at least when viewed over a longer period the conveying rate of the conveying device 8 corresponds substantially with the conveying rate which emerges from the capillary nozzles 13, with the latter being determined by the stroke and frequency of the membrane 15.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

Moreover, the individual components need not be formed in the disclosed forms, or assembled in the disclosed configuration, but could be provided in virtually any form, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended dependent claims.

What is claimed is:

1. An apparatus for producing particles of a foodstuff, having a fat content of at least 50%, a sugar content of not more than 20% and a water content of not more than 10%, with the foodstuff which is present in liquid form being applicable by means of a dosing device in the form of a film or in the form of a strip onto a moved surface of a cooling device with which the foodstuff is at least partly hardenable, characterized in that the dosing device comprises a permanently opened pass-through cross section and an elastically deformable membrane which is in contact with one surface of the foodstuff and which can be deflected in a direction approximately perpendicular to its plane, as a result of which the volume of a reservoir for the foodstuff can be changed, and that the dosing device and the cooling device are disposed in an encapsulated way within an enclosed vessel which can be sterilized in its interior.

2. An apparatus as claimed in claim 1, characterized in that the membrane forms a section of a border of a sterilizable zone.

3. An apparatus as claimed in claim 1, characterized in that the membrane has a connected actuating tappet that can be guided through a border of a sterilizable zone by a compensator which can be changed in its length in an elastic manner.

4. An apparatus as claimed in claim 1, characterized in that the dosing device comprises at least one nozzle for an outlet of the foodstuff from the reservoir.

5. An apparatus as claimed in claim 4, characterized in that a strip of capillary nozzles is provided each having an outlet diameter of approx. 0.5 mm to 3.0 mm.

6. An apparatus as claimed in claim 5, characterized in that an outlet of the capillary nozzles has a distance from the moved surface of the cooling device of between 0.5 mm and 10.0 mm.

7. An apparatus as claimed in claim 1, characterized in that the cooling device is a rotating cooling roller or a revolving moved cooling belt.

8. An apparatus as claimed in claim 1, characterized in that the temperature of a gas disposed in the interior of the vessel is in the zone of the charging of the foodstuff lower than 0° C., and the temperature of the surface of the cooling device is in the zone of the charging of the foodstuff lower than 0° C.

9. An apparatus as claimed in claim 1, characterized in that a continuously operatable rotary pump is provided for the conveyance of the foodstuff through the reservoir and the pass-through cross section of the dosing device.

10. An apparatus as claimed in claim 2, characterized in that the dosing device comprises at least one nozzle for an outlet of the foodstuff from the reservoir.

11. An apparatus as claimed in claim 3, characterized in that the cooling device is a rotating cooling roller or a revolving moved cooling belt.

12. An apparatus as claimed in claim 4, characterized in that the cooling device is a rotating cooling roller or a revolving moved cooling belt and the cooling device has a surface temperature which is lower than 20° C.

13. An apparatus as claimed in claim 2 characterized in that the cooling device is a rotating cooling roller or a revolving moved cooling belt.

14. An apparatus as claimed in claim 7, characterized in that the temperature of a gas disposed in the interior of the vessel is in the zone of the charging of the foodstuff lower than 0° C.

15. An apparatus as claimed in claim 2, characterized in that the temperature of a gas disposed in the interior of the vessel is in the zone of the charging of the foodstuff lower than 0° C., and the temperature of the surface of the cooling device is in the zone of the charging of the foodstuff lower than 0° C.

16. An apparatus as claimed in claim 3, characterized in that the temperature of the surface of the cooling device is in the zone of the charging of the foodstuff lower than 0° C., preferably lower than −20° C.

17. An apparatus as claimed in claim 7, characterized in that a continuously operatable rotary pump is provided for the conveyance of the foodstuff through the reservoir.

18. An apparatus as claimed in claim 2, characterized in that a continuously operatable rotary pump is provided for the conveyance of the foodstuff through the reservoir and the pass-through cross section of the dosing device.

19. An apparatus for making pasteurized chocolate comprising:
   a) a dosing device having a chocolate holding chamber and an elastically deformable membrane;
   b) a conveying belt operationally connected to the dosing device;
   c) a surface of the dosing device being formed from the deformable membrane which can be deflected in a direction approximately perpendicular to the membrane's plane to cordial a volume of and size of the chocolate conveyed;
   d) a cooling device in communication with the conveying belt;
   e) a sterilized vessel which encapsulates the dosing device, conveying belt, and cooling device.

20. The apparatus of claim 19, further comprising:
   a) a tappet coupled to the membrane;
   b) a pasteurization zone created by the membrane after hermetically sealing the membrane; and
   c) a drive for the membrane located outside of the pasteurization zone.

* * * * *